US006983163B2

(12) United States Patent
Sato et al.

(10) Patent No.: US 6,983,163 B2
(45) Date of Patent: Jan. 3, 2006

(54) MULTIPOINT COMMUNICATION METHOD AND COMMUNICATION CONTROL DEVICE

(75) Inventors: Teruyuki Sato, Kawasaki (JP); Yasutaka Kanayama, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 10/267,108

(22) Filed: Oct. 4, 2002

(65) Prior Publication Data

US 2003/0032440 A1 Feb. 13, 2003

Related U.S. Application Data

(63) Continuation of application No. PCT/JP00/02723, filed on Apr. 26, 2000.

(51) Int. Cl.
*H04B 7/00* (2006.01)

(52) U.S. Cl. .................. 455/519; 455/416; 379/205.1; 370/261

(58) Field of Classification Search ................ 455/416, 455/518, 519, 520; 379/202.01–206.01; 370/259, 260, 261

See application file for complete search history.

(56) References Cited

U.S. PATENT DOCUMENTS

| | | | | |
|---|---|---|---|---|
| 5,608,779 | A | | 3/1997 | Lev et al. |
| 5,987,327 | A | * | 11/1999 | Lev et al. .................. 455/445 |
| 6,522,633 | B1 | * | 2/2003 | Strawczynski ............. 370/260 |

FOREIGN PATENT DOCUMENTS

| | | |
|---|---|---|
| JP | 9-172669 | 6/1997 |
| WO | 99/44377 | 9/1999 |

OTHER PUBLICATIONS

"Technical Specification Group Core Network; Out of Band Transcoder Control-Stage 2" 3GPP TSG CB#6, Online, Nov. 15, 1999: XP002165319, pp. 1-45.

* cited by examiner

*Primary Examiner*—Nguyen T. Vo
*Assistant Examiner*—Nhan T. Le
(74) *Attorney, Agent, or Firm*—Katten Muchin Rosenman LLP

(57) ABSTRACT

In making a transition from two-point communication to three-point communication, by making preparations for three-point communication without interrupting two-point communication, and by making a transition to three-point communication when preparations are completed, momentary interruption of the conversation is eliminated. That is, while maintaining two-point communication, the transcoders at each point are made to acquire rate control information for all points, after which the transition to three-point communication is made.

14 Claims, 17 Drawing Sheets

$RFCS_1$

| ENCODING RATE | RFCI IN $RFCS_1$ |
|---|---|
| 12.2k | 63 |
| 7.95k | 62 |
| 5.15k | 61 |
| 4.75k | 60 |

(B)

$RFCS_2$

| ENCODING RATE | RFCI IN $RFCS_2$ |
|---|---|
| 12.2k | 15 |
| 7.95k | 14 |
| 5.15k | 13 |
| 4.75k | 12 |

(C)

$RFCS_3$

| ENCODING RATE | RFCI IN $RFCS_3$ |
|---|---|
| 12.2k | 31 |
| 7.95k | 30 |
| 5.15k | 29 |
| 4.75k | 28 |

(D)

| ENCODING RATE | RFCI IN $RFCS_3$ | RFCI IN $RFCS_2$ | RFCI IN $RFCS_3$ |
|---|---|---|---|
| 12.2k | 63 | 15 | 31 |
| 7.95k | 62 | 14 | 30 |
| 5.15k | 61 | 13 | 29 |
| 4.75k | 60 | 12 | 28 |

Figure 7:
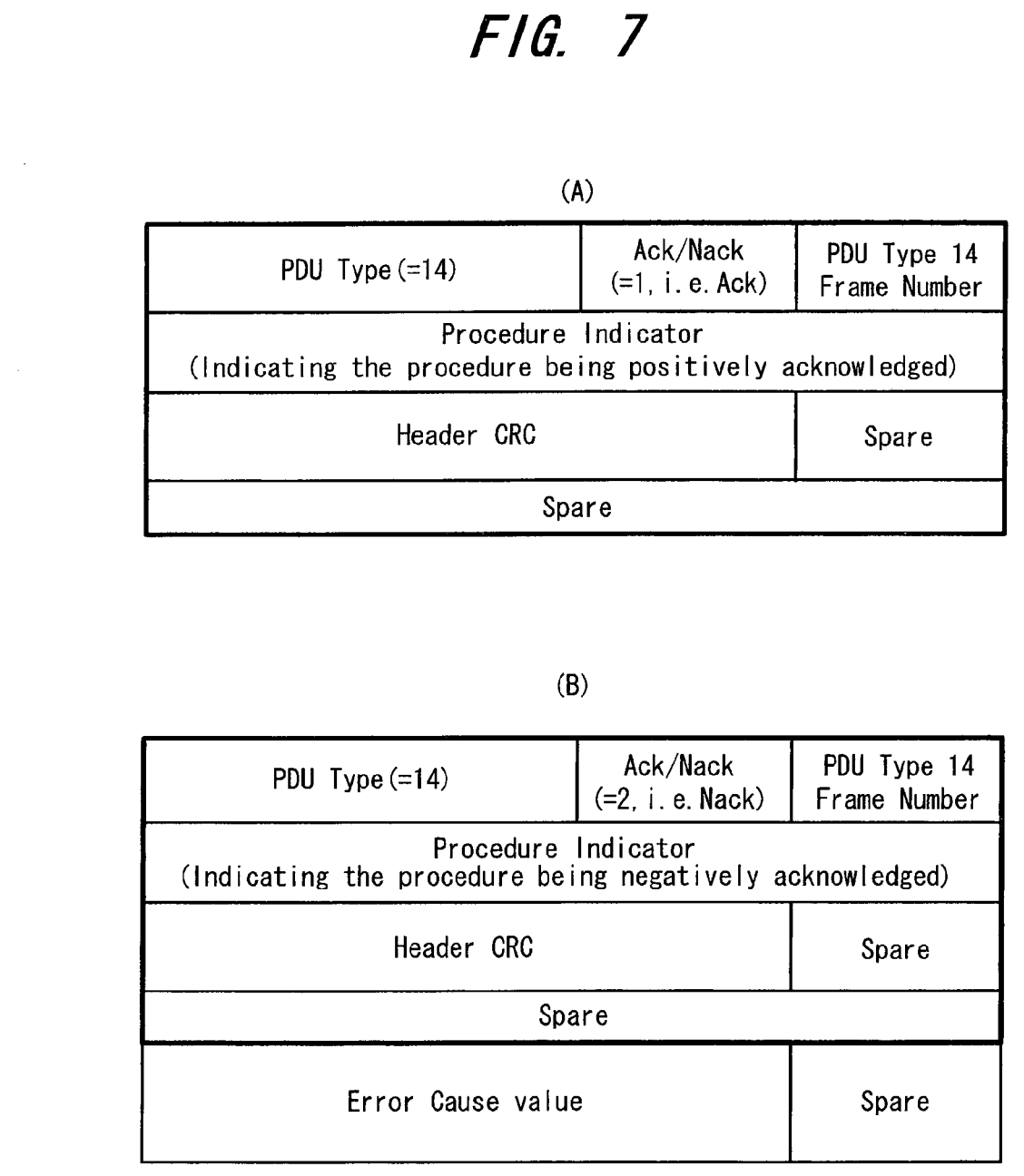

| | | |
|---|---|---|
| PDU Type (=14) | Ack/Nack (=1, i. e. Ack) | PDU Type 14 Frame Number |
| Procedure Indicator (Indicating the procedure being positively acknowledged) | | |
| Header CRC | | Spare |
| Spare | | |

(B)

| | | |
|---|---|---|
| PDU Type (=14) | Ack/Nack (=2, i. e. Nack) | PDU Type 14 Frame Number |
| Procedure Indicator (Indicating the procedure being negatively acknowledged) | | |
| Header CRC | | Spare |
| Spare | | |
| Error Cause value | | Spare |

| Codec mode | Rate(kbit/s) |
|---|---|
| AMR mode 0 | 4.75 |
| AMR mode 1 | 5.15 |
| AMR mode 2 | 5.90 |
| AMR mode 3 | 6.70 |
| AMR mode 4 | 7.40 |
| AMR mode 5 | 7.95 |
| AMR mode 6 | 10.20 |
| AMR mode 7 | 12.20 |

| ENCODING RATE | RFCI IN RFCS |
|---|---|
| 12.2k | 63 |
| 7.95k | 62 |
| 5.15k | 61 |
| 4.75k | 60 |

$RFCS_1$

| ENCODING RATE | RFCI IN RFCS |
| --- | --- |
| 12.2k | 63 |
| 7.95k | 62 |
| 5.15k | 61 |
| 4.75k | 60 |

(B)

$RFCS_2$

| ENCODING RATE | RFCI IN RFCS |
| --- | --- |
| 12.2k | 15 |
| 7.95k | 14 |
| 5.15k | 13 |
| 4.75k | 12 |

MULTIPOINT COMMUNICATION METHOD AND COMMUNICATION CONTROL DEVICE

This application is a continuation of international application number PCTJP00/02723, filed Apr. 26, 2000.

BACKGROUND OF THE INVENTION

This invention relates to a multipoint communication method and communication control device, and in particular relates to a multipoint communication method enabling communications between multiple points in a communication network, and a communication control device which realizes the above method.

In recent years there has been growth in transmission methods which perform transmission more efficiently than previously by combining such diverse media as voice, data, and images into packets, and transmitting in packet units over the same transmission channels, as seen in ATM, frame relay, and the Internet. Particularly in audio transmission, by making the transmission rate variable depending on the transmission channel characteristics (network traffic and error rate) and on the sound source, efficient transmission methods are being realized. For example, a mobile core network and the AMR (Adaptive Multi Rate) method for voice encoding in this network which are being studied for adoption of IMT-2000 are representative of systems with the above features. The AMR method is a method which determines the encoding/decoding rate according to the error rate and circuit conditions.

FIG. 13 is a diagram of the configuration of an IMT-2000 mobile core network, showing the case in which a mobile station MS communicates by voice with a telephone set, not shown, via a base station BTS, radio network controller RNC (Radio network controller) mobile service switching center MSC, and public switched telephone network PSTN. The mobile station MS incorporates a codec (coder/decoder, not shown); A/D-converted voice data is encoded at a rate indicated by the radio network controller RNC and transmitted, and encoded data which has been received is decoded into voice data, A/D-converted and output.

The radio access network RAN has decision rights for the AMR encoding rate; the radio network controller RNC issues a rate change protocol to the transcoder (TC) in the mobile switching station MSC on the core network (CN) side as necessary. As the AMR encoding rate, eight rates can be set in eight stages from 4.75 kbps to 12.20 kbps, as shown in FIG. 14; the encoding rate is specified using a rate specifier (RFCI). In IMT-2000, a plurality of encoding rates which can be used by the radio network controller RNC itself in order to provide free selection rights within the radio access network RAN, and the encoding rate currently in use, can be determined. That is, as shown in FIG. 15, the radio network controller RNC (1) sends the plurality of correspondence relations between rates and RFCIs (RFCS; RFCI set) to the transcoder TC at the time of negotiation with the transcoder TC in advance of the initiation of communication; (2) then, inputs the rate specifier RFCI into the transcoder TC, and effects encoding/decoding at the encoding rate corresponding to the RFCI; and, (3) dynamically changes the RFCI to change the encoding rate during communication in response to the error rate or other circuit conditions. FIG. 16 is an example of rate control information RFCS sent to the transcoder TC from the radio network controller RNC during negotiation, and shows that for RFCI=60 to 63 the encoding rate is 4.75, 5.15, 7.95, and 12.2 kbps.

The mobile service switch center MSC, which comprises a switch (not shown) and numerous transcoders TC, switches a packet input from a radio network controller RNC as appropriate via a prescribed transcoder TC, or without passing through a transcoder TC, for transmission to a public switched telephone network PSTN, and transmits packets from the public switched telephone network PSTN to the radio network controller unit RNC either via a transcoder TC, or directly. The transcoders TC incorporate a codec, and encode the PCM voice data input from the public switched telephone network PSTN based on the encoding rate specified by the rate specifier RFCI from the radio network controller RNC, then transmit the data to the radio network controller unit RNC, as well as decoding the encoded PCM voice data input from a mobile station MS and transmitting the data to the public switched telephone network PSTN.

As described above, the mobile station MS encodes voice data at the specified rate and transmits the data, which is input to the mobile service switching center MSC via the base station BTS and radio network controller RNC. A transcoder TC within the mobile service switching center MSC decodes the encoded voice data into PCM voice data, based on the rate corresponding to the rate specifier RFCI specified by the radio network controller RNC, and transmits the data to the public switched telephone network PSTN. PCM voice data transmitted from the other-party telephone set is input to the mobile service switching center MSC via the public switched telephone network PSTN. A transcoder TC within the mobile service switching center MSC encodes PCM voice data based on the rate specified by the rate specifier RFCI, and transmits the data to the mobile station MS via the radio network controller RNC and base station BTS. The mobile station MS decodes the input encoded voice data based on the rate specified by the radio network controller RNC, and outputs the decoded voice signals from a speaker.

Communication between the base station BTS and the public switched telephone network PSTN relies for example on ATM transmission; of this, communication between the base station BTS and the mobile service switching center MSC relies on AAL type 2 ATM transmission, and that beyond the mobile service switching center MSC relies on AAL type 1 ATM transmission. In mobile communication, in order to make efficient use of the communication band, data is compressed as described above to encode data in a low-bit rate data format for transmission. When such low-bit rate information is embedded in the payload of an ATM cell, time is required for the payload of one ATM cell to be filled with data, so that data delays occur and the quality of communication may suffer. AAL type 2 is suitable for low bit rate data transmission, and can be used to reduce delays and to efficiently utilize bandwidth. FIG. 17(A) is a diagram explaining the AAL type 2 format. An AAL type 2 format cell comprises a standard cell header HD and a standard cell payload PL; in the standard cell payload PL, there are mapped a one-byte start field STF and one or more short cells SCEL. The start field STF comprises a pointer (offset value) indicating the leading position of the first short cell SCEL. Each short cell SCEL comprises a fixed-length short cell header SHD and a variable-length short cell payload SPL; in the short cell header SHD, (1) PDU type, (2) frame number, (3) frame quality classification (FQC), and (4) an RFCI or similar, not shown, are embedded; in the short cell payloads PDU are embedded the above low-bit rate information (voice data), and appropriate rate control information RFCS.

AAL type 1 is a transmission method which realizes a CBR (constant bit rate) service; the clock timing on the receiving side is matched with the timing of the user clock (for example, the 64 kbps of voice data) on the transmitting side, and by this means the voice information on the transmitting side can be reliably reproduced on the receiving side. FIG. 17(B) is a diagram explaining the AAL type 1 format; the 48-byte standard cell payload PL comprises a one-byte SAR-PDU header and a 47 byte SAR-PDU payload. The 47-byte SAR-PDU payload is used to transfer PCM voice data; the one-byte SAR-PDU header is used for transmission and reproduction of user clock timing information.

The above rate control procedure is generally performed when making a connection between the public network PSTN and the mobile station MOBILE SERVICE SWITCHING CENTER MSC (hereafter called an L-M connection). In a connection between mobile stations (hereafter an M-M connection), a transcoder-free operation (TrFO) such as that shown in FIG. 18, which does not pass through a transcoder TC, is executed, to prevent quality degradation due to tandem connections while also effectively utilizing the resources of transcoders TC. That is, when a connection is made via transcoders $TC_1$, $TC_2$ (tandem connection), (1) encoded voice data from a mobile station $MS_1$ is decoded into PCM voice data by a transcoder $TC_1$ and transmitted; (2) the PCM voice data is encoded by the transcoder $TC_2$; and (3) the encoded voice data is decoded into voice data by the mobile station $MS_2$ and output from a speaker. However, in this method data passes through a transcoder (codec) twice, so that quality is degraded, and in addition numerous transcoders are required. Hence in an M-M connection, communication is performed using the TrFO method, without passing through a codec, and moreover transcoders are used only for calls from the public network PSTN.

In this TrFO method, because radio network controllers $RNC_1$, $RNC_2$ set their own rate control information RFCS, they may have different rate control information RFCS in a radio access network RAN. For example, as shown in FIG. 19, the radio network controller $RNC_1$ sets the rate control information $RFCS_1$ shown in (A), and the radio network controller $RNC_2$ sets the rate control information $RFCS_2$ shown in (B). In this case, each of the mobile stations cannot recognize the encoding rate indicated by the rate specifier RFCI sent from the other-party mobile station, so that encoded voice data cannot be decoded. Hence in the TrFO method, in the initialization performed prior to the start of communication, it is agreed that (1) rate control information $RFCS_1$, $RFCS_2$ is exchanged between the radio network controllers $RCN_1$, $RCN_2$ over the radio access network RAN, and (2) a rate specifier RFCI based on the rate control information $RFCS_1$, $RFCS_2$ issued by each to the other is transmitted as rate information. Under these conditions, each of the mobile stations can decode the encoded voice data sent from the other-party mobile station.

For example, if a mobile station $MS_1$ has encoded voice data at a rate of 5.15 kbps, the radio network controller $RNC_1$ appends a rate specifier RFCI of 61 to this encoded voice data and transmits the data. When the radio network controller $RNC_2$ on the receiving side receives the rate specifier RFCI (=61) together with the encoded voice data, it refers to an $RFCS_1$ table and to the received RFCI (=61), and determines that the received encoded voice data was encoded at a rate of 5.15 kbps.

The TrFO method in the above network results in no problems for voice communication between two mobile stations $MS_1$ and $MS_2$ (two-point communication). However, when a new mobile station $MS_3$ is added to the two-point communication and an attempt is made at conversation among three mobile stations (three-point communication), the following problem arises. When realizing three-point communication, as shown in FIG. 20, the TrFO communication of the two-point communication that had been conducted up to that time must be interrupted (TrFO Break), and transcoders $TC_1$, $TC_2$ must be allocated to each of the mobile stations $MS_1$, $MS_2$, and a path inserted (the allocated transcoders $TC_1$, $TC_2$ are called "assigned TCs"). On the other hand, a transcoder $TC_3$ is also allocated to the newly participating mobile station $MS_3$, and three-point communication is conducted between the transcoders (FIG. 20). That is, the transcoder $TC_1$ decodes the encoded voice data sent from the transcoders $TC_2$ and $TC_3$, synthesizes the decoded voice data, and encodes the synthesized voice data for transmission to the mobile station $MS_1$. Similarly, the transcoders $TC_2$ and $TC_3$ decode the encoded voice data sent from each of the other two transcoders, synthesize the decoded voice data, encode the synthesized voice data, and transmit the encoded voice data to the mobile stations $MS_2$ and $MS_3$ to conduct three-point communication.

Here, the fact that the rate control information $RFCS_1$ to $RFCS_3$ is that of the radio access networks $RAN_1$ to $RAN_3$, and that during TrFO communication the core network CN does not possess this information, constitutes a problem. Consequently, the assigned $TC_1$ and $TC_2$ which are started upon a TrFO break cannot be provided with rate control information RFCS from the core network CN, so that if rate control information is not provided by some means, the assigned $TC_1$ and $TC_2$ will not have the rate control information $RFCS_1$ and $RFCS_2$, so that normal encoding/decoding cannot be performed. In light of this, when making a transition from two-point communication to three-point communication, it is necessary that negotiation of the rate control information $RFCS_1$ ($RFCS_2$) be performed between the radio network controller $RNC_1$ ($RNC_2$) and the assigned $TC_1$ ($TC_2$), by means of an initialization procedure similar to that used upon L-M connection, and moreover the $RFCS_1$ and $RFCS_2$ must be mutually negotiated between the assigned $TC_1$ and $TC_2$. However, because this negotiation takes time, a momentary interruption occurs in the voice communication (two-point communication) that had been in progress over the M-M connection. Further, in multipoint communication relying on transcoders, overhead relating to TC resources and to communication bandwidth between TCs occurs.

SUMMARY OF THE INVENTION

In light of the above, an object of the present invention is to resolve the above problems, and to enable transition to (m+1)-point communication without causing a momentary interruption in the conversation over an existing m-point communication.

In the present invention, a communication control device, comprising a transcoder provided with a codec, a rate control unit which controls the encoding rate of the codec and also specifies the encoding rate for the transcoder using a rate specifier, and a switching unit which switches channels, is provided at different points, and multipoint communication among mobile stations is performed via these communication control devices. Among multipoint communications, three-point communication is realized by making a transition from two-point communication to three-point communication, and in general (m+1)-point communication is realized by making a transition from m-point communication to (m+1)-point communication.

In two-point communication, the rate control unit of the communication control device at one of the points is connected to the rate control unit of the communication control device at the other point, without passing through the transcoder, and the rate control information RFCS which is the correspondence relation between rate specifiers and encoding rates is exchanged between the two; in one rate control unit, the rate specifier RFCI which is sent together with voice data from the rate control unit at the other point is compared with the above rate control information, and is replaced with the unit's own rate specifier for transmission to the mobile station. Through such two-point communication, the number of decoding/encoding operations can be reduced, and quality degradation can be prevented.

When making a transition from two-point communication to three-point communication, the switching unit connects the rate control unit to the transcoder in the communication control devices of each of the three points, and also establishes communication paths between each of the transcoders. The transcoder of one of the points which had been engaged in two-point communication transmits the encoded voice data output from the rate control unit and the rate specifier to the rate control unit at the other point of the two-point communication, and moreover inputs the encoded voice data and rate specifier sent from the rate control unit of the other point to the rate control unit of the first point of the two-point communication; each of the rate control units continue control in the two-point communication. By this means, while maintaining two-point communication, preparations for three-point communication can be performed. In this state, rate control information for all points is acquired by each of the transcoders at the three points, and a transition to three-point communication is made.

In three-point communication, the transcoders at each point: (1) during transmission, replicate encoded voice data and transmit the data to the transcoders of a plurality of other points, and (2) during reception, use the above rate control information to substitute their own rate specifiers for the rate specifiers sent together with encoded voice data from transcoders at other points, and transmit to the mobile station; or, decode the encoded voice data, encode the decoded voice data at a permitted encoding rate, append the rate specifier indicating the encoding rate to the encoded voice data, and transmit the result to the mobile station.

As in the above, when making a transition from two-point communication to three-point communication, preparations for three-point communication are made while maintaining two-point communication, and when preparations have been completed, the transition to three-point communication is made, so that momentary interruptions in conversation can be eliminated.

Further, when encoded voice data is received from only one other point, there is no need to perform decoding/encoding in the transcoder, so that voice quality can be maintained; however, when encoded voice data is received simultaneously from two or more other points, by performing decoding/synthesis/encoding of each, the voices of a plurality of speakers can be heard simultaneously.

Also, even when encoded voice data is received from only one other point, if the rate indicated by the rate specifier sent together with the encoded voice data is not permitted by the mobile station, decoding is performed using the rate in question, the decoded voice signals are encoded at a permitted encoding rate, and a rate specifier indicating the encoding rate is appended and sent together with the encoded voice data to the mobile station. By this means, the mobile station can reliably decode and output the received encoded voice data.

Further, by transmitting the encoded voice data and rate control information over the same channel (in-channel control), each of the transcoders can be made to acquire the rate control information by means of simple control, while maintaining two-point communication.

BRIEF DESCRIPTION OF THE DRAWINGS

FIG. 4 is a figure explaining the rate control information RFCS and substitution of a rate specifier RFCI;

FIG. 7 shows the configuration of the payload of a packet (cell) for notification of normal reception/abnormal reception of rate control information RFCS;

FIG. 19 is a figure explaining the RFCS at each point in two-point communication; and, FIG. 20 is a figure explaining problems with the prior art in a transition from two-point communication to three-point communication.

DESCRIPTION OF THE PREERRED EMBODIMENTS (A) Overall Network Configuration

Figure 1:
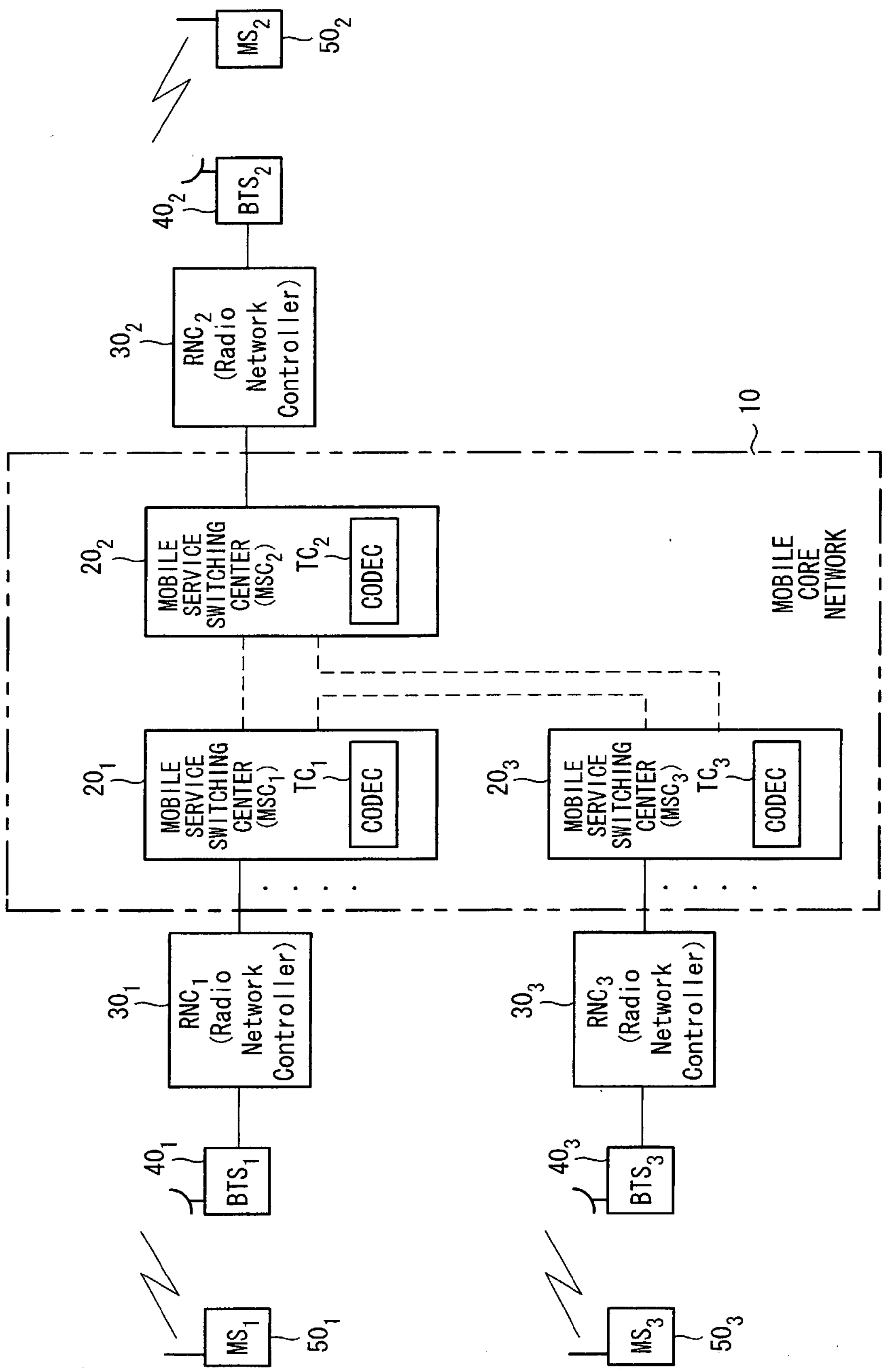
FIG. 1 is a figure of the overall configuration of a network.

FIG. 1 is a diagram of the overall configuration of a network; numerous (in the figure, three) mobile service switching centers ($MSC_1$ to $MSC_3$) $\mathbf{20}_1$ to $\mathbf{20}_3$ are provided in the mobile core network 10. Numerous (in the figure, one) radio network controller ($RNC_1$ to $RNC_3$) $\mathbf{30}_1$ to $\mathbf{30}_3$ are connected to each mobile service switching center $\mathbf{20}_1$ to $\mathbf{20}_3$, and each radio network controller $\mathbf{30}_1$ to $\mathbf{30}_3$ is connected to a base station ($BTS_1$ to $BTS_3$) $\mathbf{40}_1$ to $\mathbf{40}_3$. Each of the base stations $\mathbf{40}_1$ to $\mathbf{40}_3$ conducts bidirectional radio communication with the mobile stations ($MS_1$ to $MS_3$) $\mathbf{50}_1$ to $\mathbf{50}_3$ within the radio zone managed by the base station.

(B) Mobile Service Switching Center (MSC)

Figure 2:
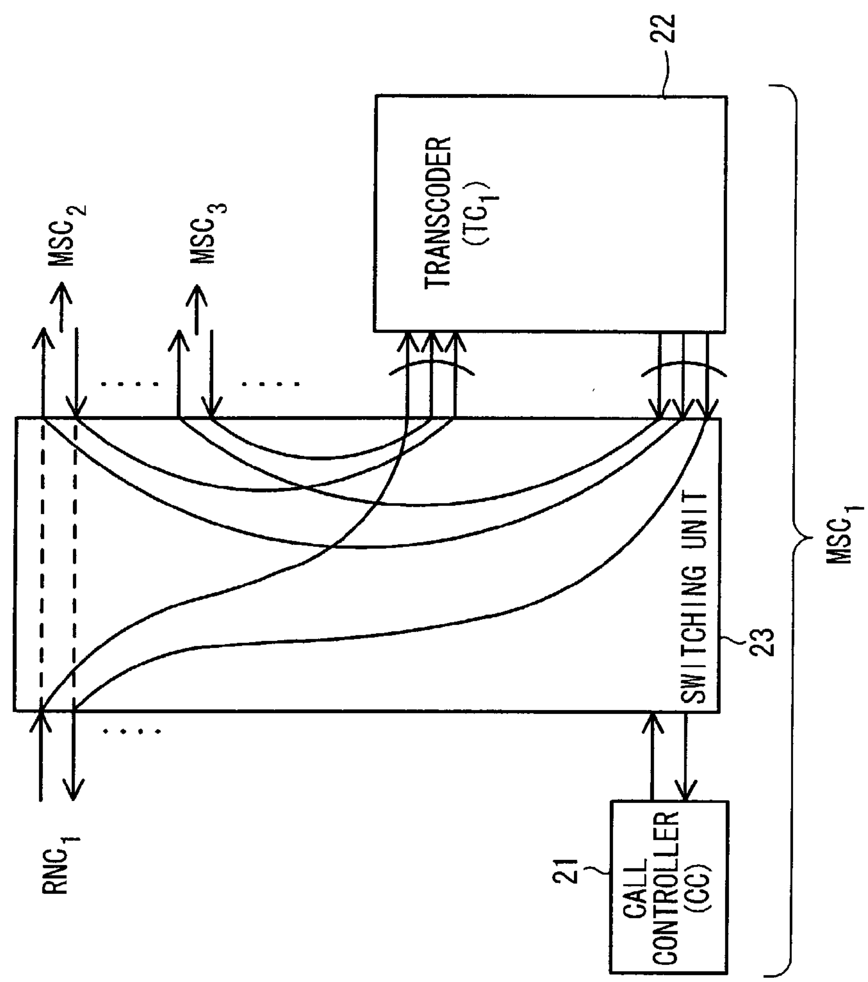
FIG. 2 is a diagram of the configuration of a mobile service switching center.

Each of the mobile service switching centers $\mathbf{20}_1$ to $\mathbf{20}_3$ has the same configuration; for example, the mobile service switching center $\mathbf{20}_1$ has a call controller 21, a plurality (only one is shown) of transcoders ($TC_1$: transcoder) 22, and a switching unit 23, as shown in FIG. 2. The transcoder 22 performs transcoding processing, and as explained below, incorporates a codec which performs encoding and decoding of voice signals. The switching unit 23 switches encoded voice data arriving from an uplink input route connected to the radio network controller ($RNC_1$) $\mathbf{30}_1$, under control of the call controller 21, to a prescribed uplink output route, either through or not through a transcoder ($TC_1$) 22, for transmission to other mobile service switching centers $MSC_2$, $MSC_3$. Also, the switching unit 23 switches the encoded voice data input via the downlink input route from the other mobile service switching centers $MSC_2$, $MSC_3$ to a prescribed downlink output route connected to the radio network controller ($RNC_1$) $\mathbf{30}_1$, either through or not through a transcoder ($TC_1$) 22.

(C) Radio Network Controller (RNC)

Figure 3:
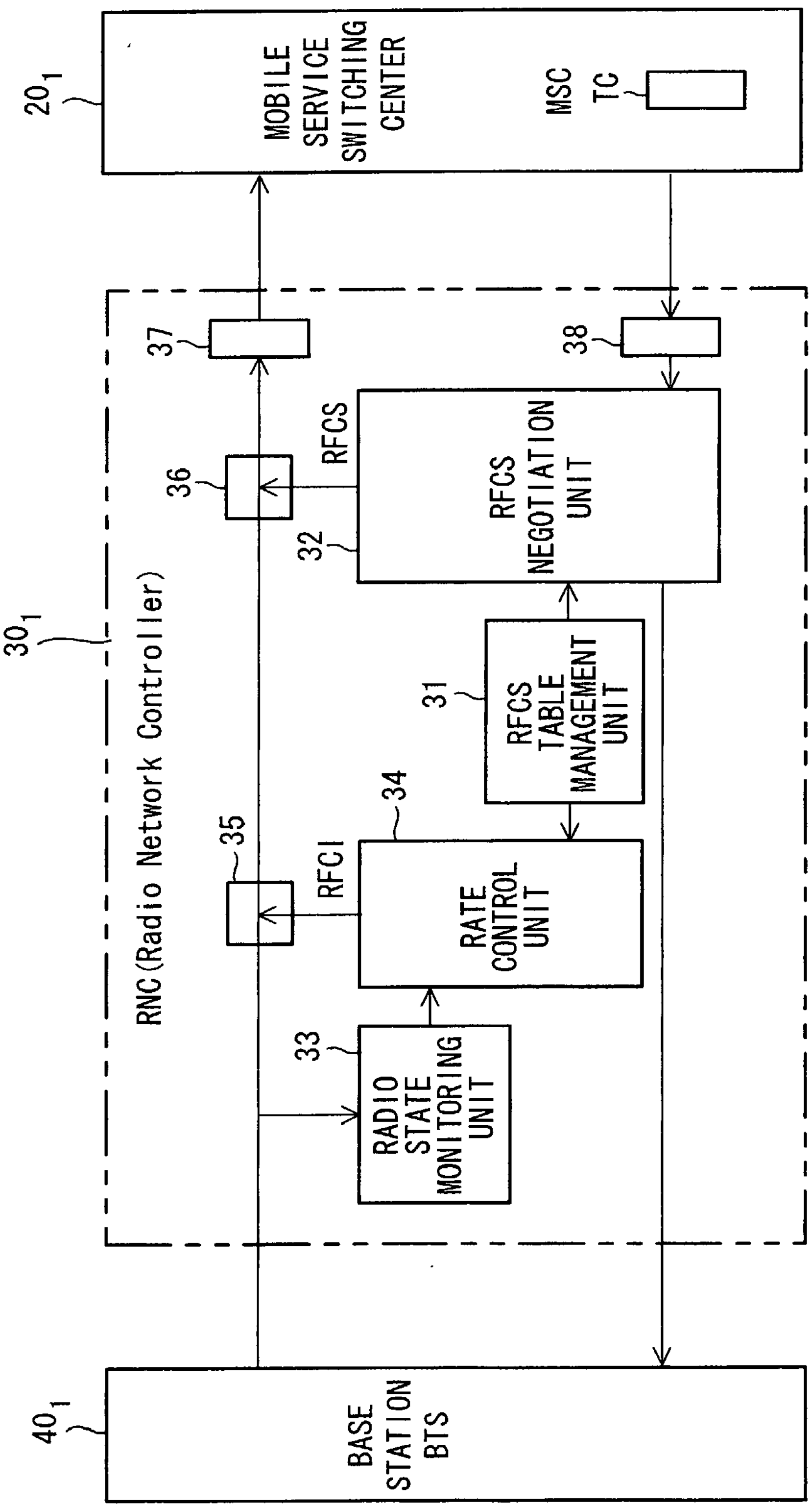
FIG. 3 is a diagram of the configuration of a radio network controller (RNC)

The radio network controller (RNCs) $\mathbf{30}_1$ to $\mathbf{30}_3$ determine the encoding rates in the transcoders $TC_1$ to $TC_3$, and also indicate the encoding rate by means of a rate specifier RFCI. As shown in FIG. 3, the radio network controller ($RNC_1$) $\mathbf{30}_1$ comprises an RFCS table management unit 31, which maintains and manages a correspondence relation between encoding rates and rate specifiers RFCI (rate control information RFCS; RFCI set); an RFCS negotiation unit 32, which performs negotiation of the rate control information RFCS with other units at the time of communication; a state monitoring unit 33, which monitors the state (error rate and similar) of the radio unit; a rate control unit 34, which determines the encoding rate based on the error occurrence state of the radio unit, and transmits a rate specifier RFCI; an RFCI insertion unit 35, which inserts the rate specifier RFCI in a prescribed position of the packet (cell); an RFCS insertion unit 36, which inserts the rate control information RFCS in a prescribed position of the packet (cell); a packet transmission unit 37; and a packet reception unit 38.

The table of rate control information RFCS set in the RFCS table management unit 31 may differ for each radio network controller RNC. For example, as shown in FIG. 4, the rate control information $RFCS_1$ of (A) is set by the radio network controller $\mathbf{30}_1$, the rate control information $RFCS_2$ of (B) is set by the radio network controller $\mathbf{30}_2$, and the rate control information $RFCS_3$ of (C) is set by the radio network controller $\mathbf{30}_3$. The rate control unit 34 determines the encoding rate based on the radio state (error rate), and transmits a rate specifier RFCI corresponding to the encoding rate. For example, if numerous errors occur, the encoding rate is set such that the compression ratio is low; if there are no errors, the encoding rate is determined such that the compression rate is increased, and a rate specifier RFCI corresponding to this encoding rate is transmitted.

(D) Frame Configuration

Figure 5:
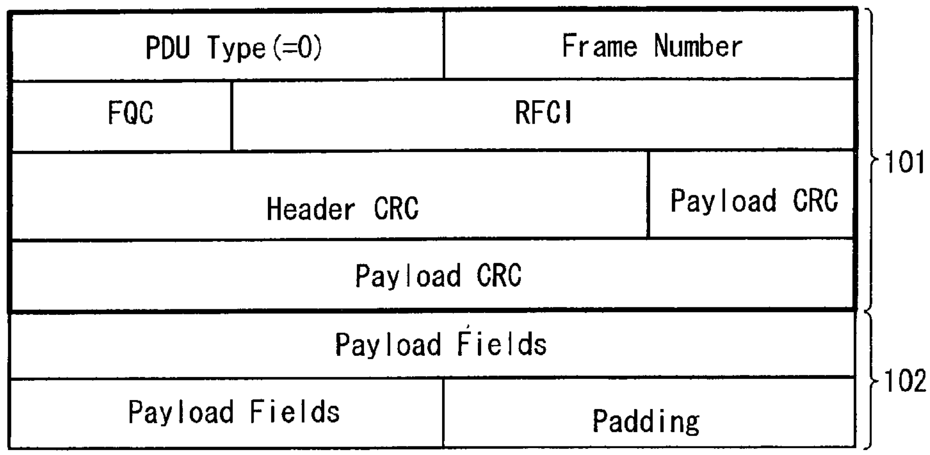
FIG. 5 shows the configuration of the payload of a packet (cell) for voice data transmission.

Encoded voice data is mapped to, for example, an AAL type 2 cell and transmitted; similarly, a rate specifier RFCI and rate control information RFCS are also mapped to appropriate places in a cell and transmitted. FIG. 5 shows the configuration of the payload of a cell for encoded voice data transmission, which comprises a short header portion 101 and a short cell payload portion 102; the items mapped to the header portion 101 are (1) the PDU type (=0), (2) the frame number (cell number), (3) the FQC (frame quality classification), (4) the rate specifier RFCI, (5) the header portion CRC, and (6) the payload portion CRC, while the encoded voice data is mapped to the payload portion 102.

Figure 6:
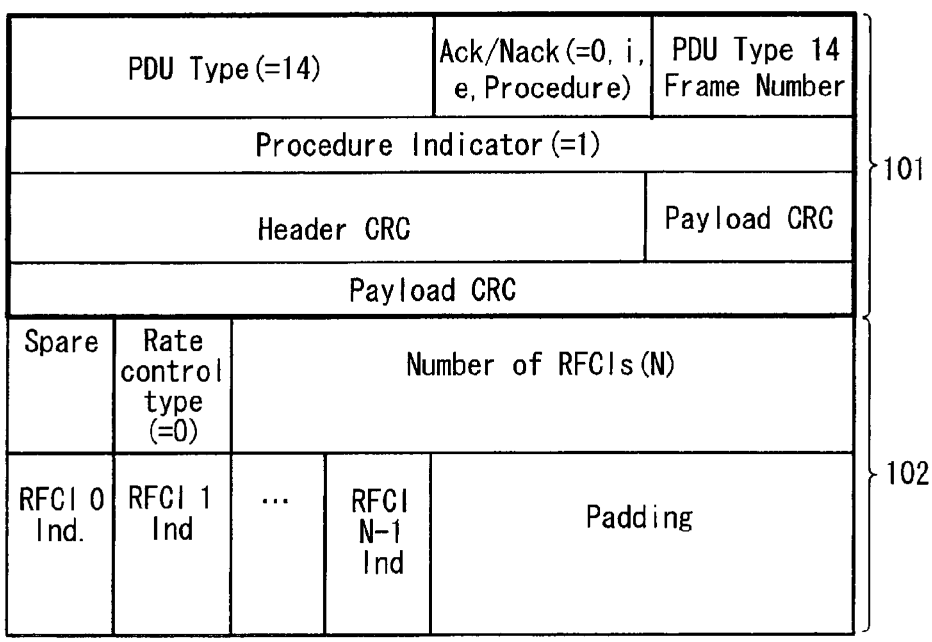
FIG. 6 shows the configuration of the payload of a packet (cell) for transmission of rate control information RFCS.

FIG. 6 shows the configuration of the payload of a cell for transmission of rate control information RFCS; items mapped to the short cell header portion 101 are (1) the PDU type (=14), (2) an ACK/NACK field, (3) a frame number, (4) a procedure indicator, (5) a header portion CRC, and (6) a payload portion CRC. The rate control information RFCS is mapped to the payload portion 102.

In FIG. 7, (A) is a diagram of the configuration of the header portion providing notification of the normal reception of rate control information RFCS, with ACK/NACK=1; (B) is the configuration of the header portion providing notification of abnormal reception of the rate control information RFCS, with ACK/NACK=2, and the error factor embedded in the payload portion.

From the above, a radio network controller RCN can use the same channel used for encoded voice data to negotiate rate control information RFCS with a transcoder or other unit. Also, by mapping encoded voice data to the padding field in FIG. 6, negotiation can be performed using a packet type in which encoded voice data and rate control information are included in the same packet.

(E) Transcoder (TC)

Figure 8:
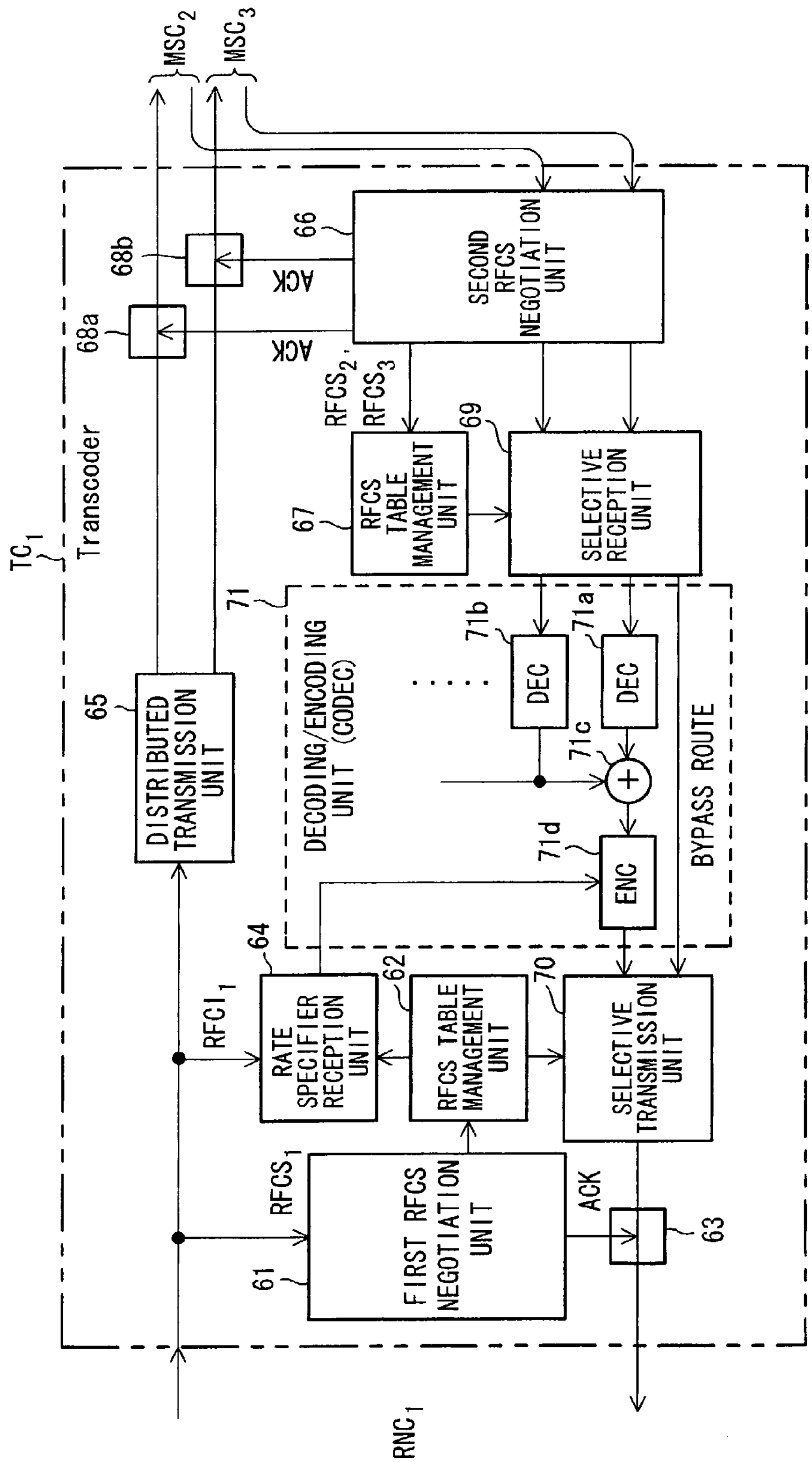
FIG. 8 is a diagram of the configuration of a transcoder.

FIG. 8 is a diagram of the configuration of a transcoder provided in a mobile service switching center; the transcoder $TC_1$ within the mobile service switching center $MSC_1$ is shown, but other transcoders have the same configuration. The first RFCS negotiation unit 61 performs negotiation with the radio network controller ($RNC_1$) $\mathbf{30}_1$ at the time of multipoint communication, acquires rate control information $RFCS_1$ ((A) in FIG. 4), and stores this rate control information ($RFCS_1$) in the RFCS table management unit 62. The ACK/NACK insertion unit 63 inserts ACK/NACK information, indicating normal or abnormal reception of the rate control information ($RFCS_1$), into an appropriate place in the downlink cell, which is transmitted. The rate specifier reception unit 64 extracts the rate specifier $RFCI_1$ sent from the radio network controller ($RNC_1$) 30, references the rate control information ($RFCS_1$) stored in the RFCS table management unit 62, determines the encoding rate specified by the rate specifier $RFCI_1$, and inputs this to the codec encoder, described below.

The distributed communication unit 65 replicates and broadcasts encoded voice data to multiple points in multipoint communication (for example, three-point communication).

The second RFCS negotiation unit 66 performs negotiation among the transcoders $TC_2$, $TC_3$ of the mobile service switching centers $MSC_2$, $MSC_3$ in the event of multipoint communication, acquires rate control information $RFCS_2$, $RFCS_3$ ((B), (C) in FIG. 4), and stores the rate control information ($RFCS_2$, $RFCS_3$) in the RFCS table management unit 67. The ACK/NACK insertion units 68*a*, 68*b* insert ACK/NACK information, indicating normal or abnormal reception of the rate control information ($RFCS_2$, $RFCS_3$), in an appropriate place in the uplink cell, and transmits the data. The selective reception unit 69 receives encoded voice data from each of the points, stores the data in a data buffer, and selects the output destination according to each of the following cases:

(1) when encoded voice data is received from only one other point, and the encoding rate indicated by the rate specifier sent together with the encoded voice data is included in the rate control information $RFCS_1$;

(2) when encoded voice data is received from only one other point, and the encoding rate indicated by the rate specifier sent together with the encoded voice data is not included in the rate control information $RFCS_1$; and, (3) when encoded voice data is received simultaneously from two or more other points.

Even in multipoint communications, often only a single person is speaking at any one time; if the VOX transmission method, in which signals are transmitted only when there is sound, is used, only voice data from the mobile station of the speaker is stored in the received data buffer. Hence it is possible to judge whether encoded voice data is being received only from one other point, or whether encoded voice data is being received simultaneously from two or more other points, according to whether data is being stored in each of the received data buffers. The selective reception unit 69 and selective transmission unit 70 can reference the table management units 62, 67.

Given the above, in case (1), the selective reception unit 69 transmits the rate specifier $RFCI_2$ (or $RFCI_3$) together with the encoded voice data to the selective transmission unit 70. The selective transmission unit 70 determines the encoding rate indicated by the rate specifier $RFCI_2$ (or $RFCI_3$) sent together with encoded voice data, referring to the rate control information $RFCS_2$ (or $RFCS_3$), determines the rate specifier $RFCI_1$ corresponding to this encoding rate, referring to the rate control information $RFCS_1$, appends this rate specifier to the encoded voice data, and transmits the data to the mobile station. For example, if the rate specifier $RFCI_3=31$ is appended to the encoded voice data received from the transcoder $TC_3$ (cf. FIG. 4(C)), the selective reception unit 69 refers to the rate control information $RFCS_3$, and judges that the encoding rate is 12.2 kbps. Then, the selective transmission unit 70 refers to the rate control information $RFCS_1$ to determine that the rate specifier corresponding to an encoding rate of 12.2 kbps is $RFCI_1=63$, and appends this rate specifier to the encoded voice data, which is transmitted to the mobile station.

In the case of (2), the selective reception unit 69 determines the encoding rate indicated by the rate specifier $RFCI_2$ (or $RFCI_3$) sent together with encoded voice data, referring to the rate control information $RFCS_2$ (or $RFCS_3$), and inputs the encoding rate and the encoded voice data into the first decoder 71*a* of the codec 71. The decoder 71*a* decodes the encoded voice data based on the encoding rate, and inputs the voice data obtained to the encoder 71*d*. The encoder 71*d* encodes the voice data based on the encoding rate indicated by the rate specifier reception unit 64, and inputs the encoded voice data to the selective transmission unit 70. The selective transmission unit 70 appends the rate specifier $RFCI_1$ indicated by the radio network controller $RNC_1$ to the encoded voice data input from the encoder, and outputs the result.

In the case of (3), the selective reception unit 69 determines the encoding rates indicated by the rate specifiers $RFCI_2$, $RFCI_3$ sent together with the respective encoded voice data, referring to the rate control information $RFCS_2$, $RFCS_3$, and inputs the encoding rates and the encoded voice data to the respective first and second decoders 71*a*, 71*b* of the codec 71. The first and second decoders 71*a*, 71*b* decode the encoded voice data based on the respective encoding rates, and the adder 71*c* synthesizes the voice data thus obtained for input to the encoder 71*d*. The encoder 71*d* encodes the synthesized voice data based on the encoding rate indicated by the rate specifier reception unit 64, and inputs the encoded voice data to the selective transmission unit 70. The selective transmission unit 70 appends the rate specifier RFCI indicated by the radio network controller $RNC_1$ to the input encoded voice data, and outputs the result.

Figure 9:
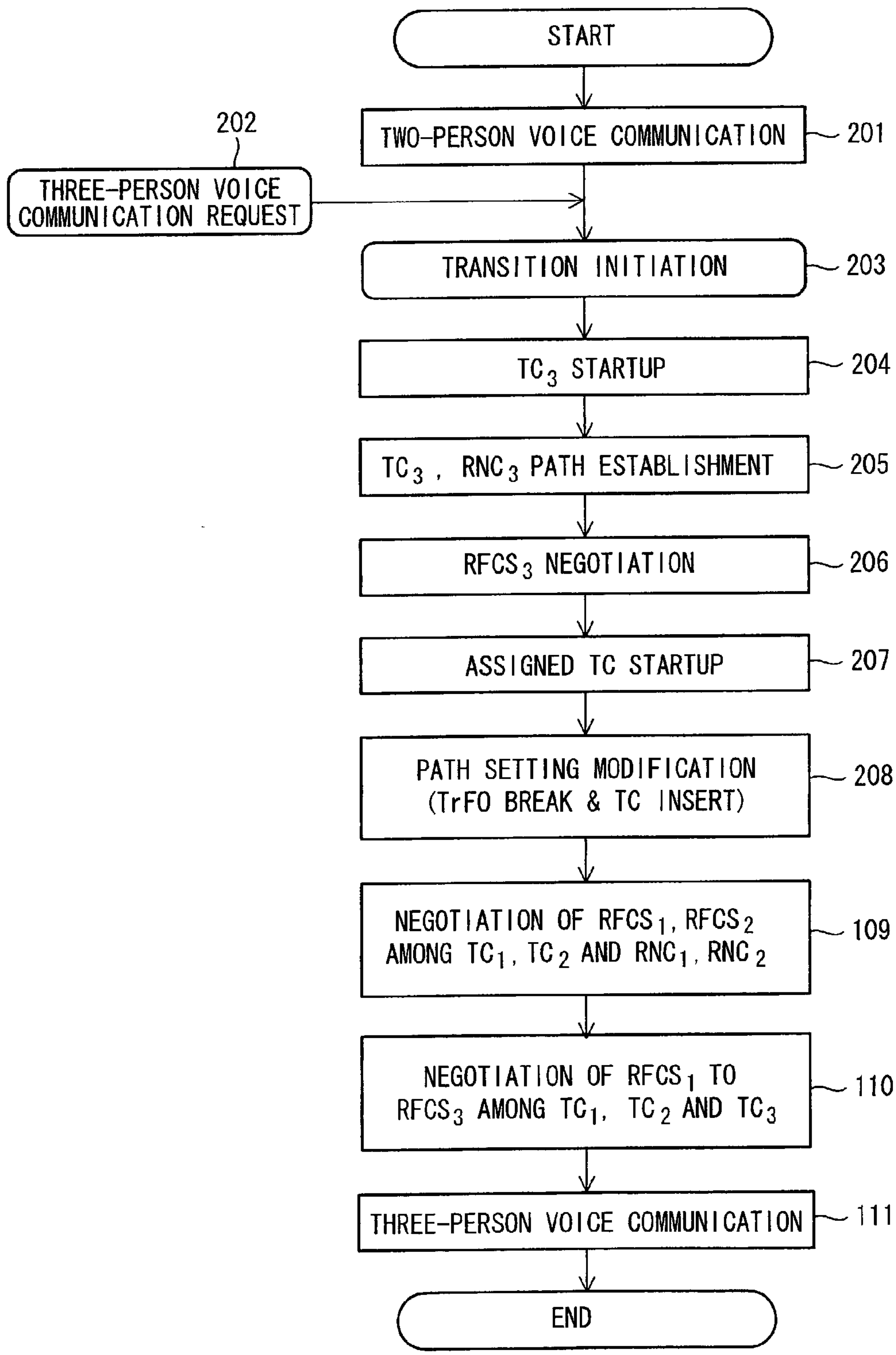
FIG. 9 is a figure explaining the procedure for controlling transition from two-person voice communication to three-person voice communication of this invention.
Figure 10:
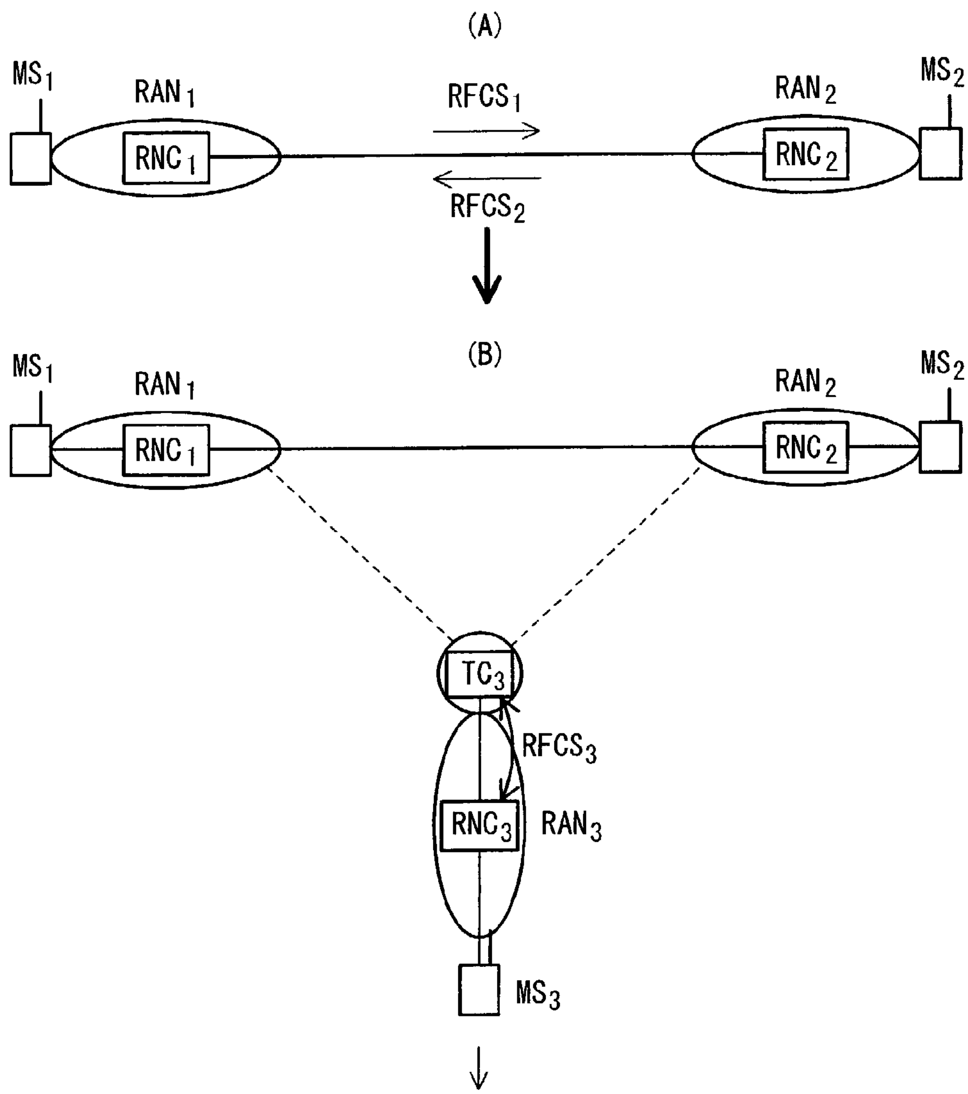
FIG. 10 is a first figure explaining control of the transition from two-person voice communication to three-person voice communication.
Figure 11:
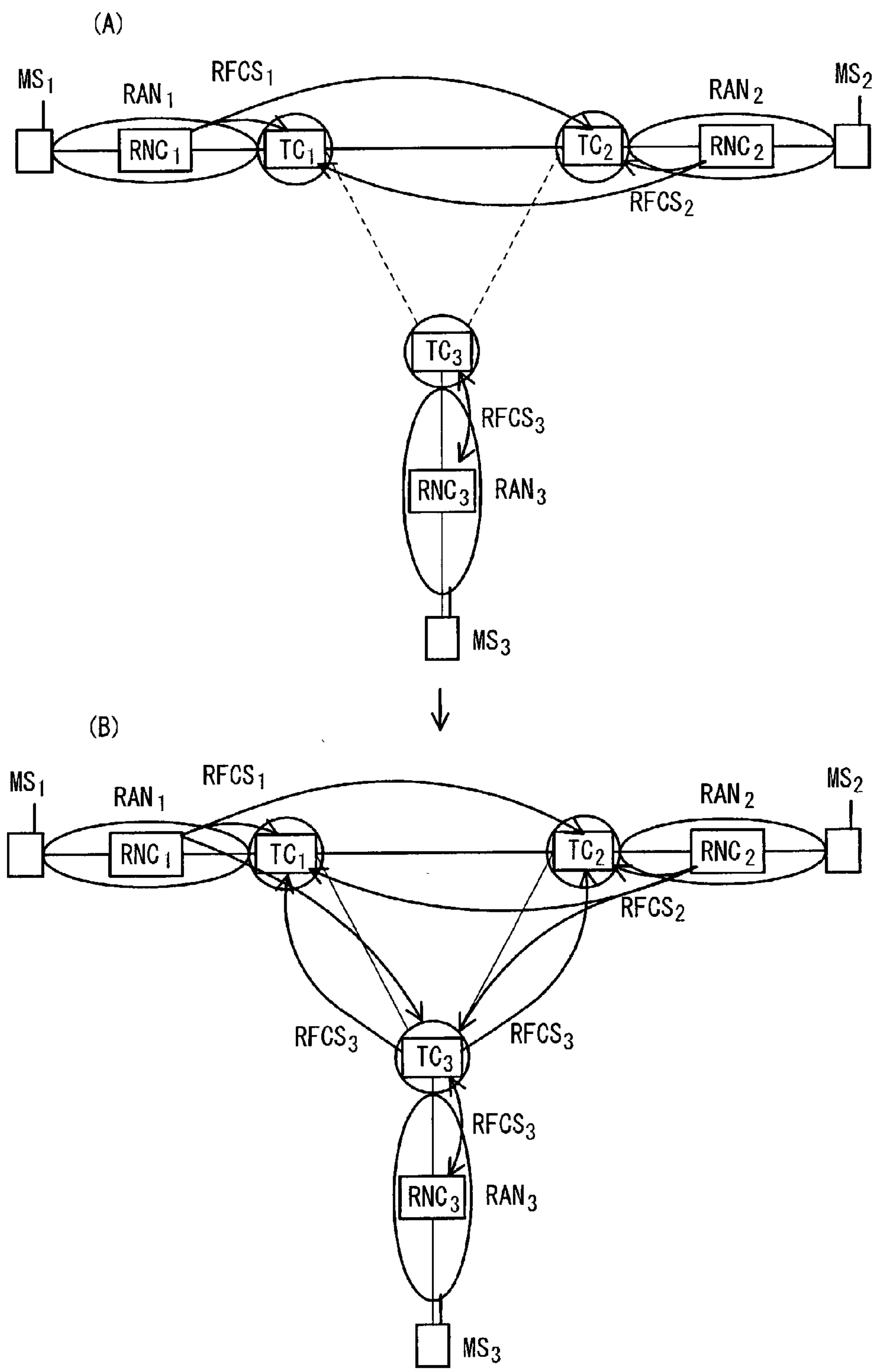
FIG. 11 is a second figure explaining control of the transition from two-person voice communication to three-person voice communication.

(F) Control for Transition from Two-Person Voice Communication to Three-Person Voice Communication FIG. 9 shows the processing flow of control in a transition from two-person voice communication to three-person voice communication; FIGS. 10 and 11 explain transition control. Here three-person voice control is given as an example; control for voice communication involving a greater number of points is discussed later.

In order to realize three-person communication (three-point communication) among the mobile stations $MS_1$ to $MS_3$, first an M-M communication mode between two persons, such as shown in (A) of FIG. 10, is created (two-point communication, step 201). At this time, voice communication is conducted by the TrFO method, which does not use the transcoders TC of the radio communication network which is the core network. When making a transition from two-person communication to three-person communication, the mobile station $MS_3$ of the third person ((B) of FIG. 10) first calls one of the mobile stations $MS_1$, $MS_2$ of the two persons already engaged in voice communication (step 202). The call controller 21 of the mobile service switching center $\mathbf{20}_1$ of the called party recognizes the three-person communication request and issues permission for three-person communication, and subsequently the control units of each mobile service switching center (called an upper-level call control device) cooperate to initiate processing for a transition to three-person communication (step 203).

First, the upper-level call control device starts the transcoder $TC_3$ allocated to the newly participating mobile station $MS_3$ (step 204). That is, (1) the transmission origin address $RNC_{3out}$ of encoded voice data from the radio network controller $RNC_3$, received by the distributed communication unit 65 (FIG. 8) of the transcoder $TC_3$, (2) the transmission origin addresses of copies (the two transcoders $TC_{1in}$, $TC_{2in}$), (3) the transmission origin addresses (the two address $TC_{1out}$, $TC_{2out}$) of encoded voice data from the transcoders $TC_1$, $TC_2$ received by the selective reception unit 69, and (4) the transmission origin address $RNC_{3in}$ for transmission to the radio network controller $RNC_3$ by the selective transmission unit 70, are provided, and three-person communication (communication parameter N=3) is started. The communication parameter N=2 corresponds to normal two-person communication. At this time, because the transcoder $TC_3$ is an assigned TC on the new participant side, the upper-level call control device notifies the transcoder $TC_3$ of the fact that negotiation of the rate control information RFCS among TCs is necessary, as described below, by means of a startup parameter.

Next, a path between the radio network controller $RNC_3$ and the transcoder $TC_3$ is established (step 205), and negotiation between them of the rate control information $RFCS_3$ is performed (step 206). On acquiring the rate control information $RFCS_3$, the transcoder $TC_3$ transmits the rate control information $RFCS_3$ to the transcoders $TC_1$, $TC_2$ at the other two points, and continues processing to notify these transcoders of the rate control information $RFCS_3$ until an ACK (acknowledge) is returned.

On the other hand, the path settings of the M-M call (two-point communication) which has been in progress are modified from TrFO communication mode to transcoder TC connection mode. The following processing is necessary for both the radio network controllers $RNC_1$ and $RNC_2$, but to simplify the explanation, processing by the radio network controller $RNC_1$ is used as an example.

The assigned $TC_1$ ((A) of FIG. 11) to which to connect the radio network controller $RNC_1$ is determined (resource hunt), and similarly to the case of the newly participating transcoder $TC_3$, (1) the transmission origin address $RNC_{1out}$ of encoded voice data from the radio network controller $RNC_1$, received by the distributed communication unit 65 of the transcoder $TC_1$, (2) the transmission origin addresses of copies (the two transcoders $TC_{2in}$, $TC_{3in}$), (3) the transmission origin addresses of encoded voice data from the transcoders $TC_2$, $TC_3$ received by the selective reception unit 69 ($TC_{2out}$, $TC_{3out}$), and (4) the transmission origin address $RNC_{1in}$ for transmission to the radio network controller $RNC_1$ by the selective transmission unit 70, are provided, and three-person communication (communication parameter N=3) is started (step 207).

After starting the assigned $TC_1$ and $TC_2$, the path settings in the network are modified (step 208). By this means, a TrFO break and TC insert are performed. The transmission unit 37 (FIG. 3) and reception unit 38 of the radio network controller $RNC_1$ changes the setting from the address of the radio network controller $RNC_2$ with which it had been communicating to the address of the assigned $TC_1$, and executes a TrFO break. At this time, the assigned $TC_1$ and assigned $TC_2$ have already been started, and the path already established, so that after the TrFO break, a TC insert is immediately executed, and for the following reason the path between the two points previously in communication (the M-M call) is instantaneously established, even after a TrFO break. By this means, the radio network controller $RNC_1$ can continue control operations similar to those of the previous two-person communication.

As a result of a TrFO break/TC insert, encoded voice data from the mobile station $MS_1$ is input without modification to the assigned $TC_1$ via the radio network controller $RNC_1$. The distributed communication unit 65 (FIG. 8) of the assigned $TC_1$ copies the encoded voice data from the radio network controller $RNC_1$, and transmits this data to the transcoders $TC_2$ and $TC_3$. On receiving this data, the selective reception unit 69 of the assigned $TC_2$ at the communication destination for two-point communication transmits the encoded voice data to the selective transmission unit 70, bypassing the codec 71, and the selective transmission unit 70 sends the encoded voice data without modification to the radio network controller $RNC_2$. That is, even if the transcoders $TC_1$, $TC_2$ are inserted in the path, the same encoded voice data as previously can be transmitted and received between the radio network controllers $RNC_1$ and $RNC_2$. Subsequently, the radio network controllers $RNC_1$, $RNC_2$ execute control similar to that of the previous two-person communication (M-M call), and continue two-person communication. Thus even if a TC insert is executed after a TrFO break, two-point communication can be continued as before, without a momentary interruption of the existing M-M call.

When the path settings are changed and notification of a TrFO break is issued, the radio network controller $RNC_1$ must transmit its own rate control information $RFCS_1$ to the transcoder $TC_2$ by means of negotiation prior to a transition to three-person communication ((A) of FIG. 11). This is because while in three-person communication, the selective transmission unit 70 of the transcoder $TC_2$ must convert the rate specifier $RFCI_1$ received together with encoded voice data from the transcoder $TC_1$ into a rate specifier $RFCI_2$ according to the rate control information $RFCS_2$, rather than the rate control information $RFCS_1$. Similarly, when the path settings are changed and notification of a TrFO break is issued, the radio network controller $RNC_2$ must transmit its own rate control information $RFCS_2$ to the transcoder $TC_1$ by means of negotiation prior to a transition to three-person communication.

Negotiation of the rate control information RFCS is performed over the same channel as the encoded voice data channel (in-channel method), and on receiving the rate control information RFCS, the assigned TC returns an acknowledge signal to the radio network controller RNC which is the transmission origin. Through this in-channel method, procedures to set and release the negotiation channel can be eliminated. The rate change protocol between the radio network controller $RNC_1$ and transcoder $TC_1$ conforms to the rate control information $RFCS_1$. Consequently the transcoder $TC_1$ must know not only the rate control information $RFCS_2$, but the rate control information $RFCS_1$ as well. By means of the in-channel method, the radio network controller $RNC_1$ can transmit the rate control information $RFCS_1$ to the transcoder $TC_1$ simply through negotiation. As described with reference to FIG. 5 to FIG. 7, as the data packet (cell) for negotiation, a packet type (FIG. 6) different from that of encoded voice data (FIG. 5) is sent, so that the two can be discriminated. A method can also be employed involving mapping for transmission together with a voice data packet. The above constitutes step 109.

Next, rate control information $RFCS_1$ to $RFCS_3$ is negotiated between the newly participating side ($RNC_3$, $TC_3$) and the transcoders $TC_1$, $TC_2$ at the other points (step 110). As already explained, when negotiation of the rate control information $RFCS_3$ between the transcoder $TC_3$ and radio network controller $RNC_3$ is completed (step 206), because the fact that negotiation between TCs is necessary is specified at startup, the transcoder $TC_3$ initiates negotiation of rate control information $RFCS_1$ to $RFCS_3$ with the transcoder $TC_1$ and transcoder $TC_2$. When the opposing transcoders $TC_1$, $TC_2$ are started, and a path between the transcoders TC is established, rate control information is transmitted and received, negotiation between the transcoders is completed, and subsequently negotiation between transcoders and radio network controllers is also completed ((B) of FIG. 11).

To summarize the above, the transcoder is activated by the initiation of negotiation of the rate control information with the radio network controller, and negotiation of rate control information between transcoders is initiated. And, excitation upon the completion of negotiation of rate control information between transcoders causes the negotiation of rate control information between radio network controllers to be completed. When the above negotiation of rate control information $RFCS_1$ to $RFCS_3$ is completed, voice communication with a newly participating mobile station $MS_3$ (three-person voice communication), in addition to the voice communication already established between transcoders $TC_1$ and $TC_2$, is realized (step 111).

That is, the distributed transmission unit 65 (FIG. 8) of the transcoder $TC_3$ creates two replicas of the encoded voice data packet received from the radio network controller $RNC_3$, adds to the packets the addresses of the opposing transcoders $TC_1$, $TC_2$ provided in the startup parameters, and transmits the packets. Due to the data path settings in the system, these packets are sent to the respective transcoders $TC_1$, $TC_2$. On the other hand, data packets from the transcoders $TC_1$, $TC_2$ are arrived in the buffer of the selective reception unit 69, and are read from the buffer with a certain timing (in general, equivalent to the encoding frame period). Here, the rate control information $RFCS_1$, $RFCS_2$ obtained in negotiation and the rate control information $RFCS_3$ at the time of initialization of the transcoder TC are compared.

First, in comparing the rate control information $RFCS_1$ and $RFCS_2$, the encoding rates are extracted. If an encoding rate exists within the rate control information $RFCS_3$, and moreover this rate is currently permitted by the radio network controller $RNC_3$, then a valid flag is set for the voice data packet. If only one valid voice data packet has arrived, this data packet is passed to the selective transmission unit 70. In subsequent cases, when two valid voice data packets have arrived, or when there is voice data with an invalid flag, these values are passed to the synthesis encoding unit (codec) 71.

The synthesis encoding unit 71 allocates a plurality of voice data packets to the respective decoders 71*a*, 71*b*, . . . , and by decoding these linear PCM voice data is obtained; after addition, the data is again encoded by the encoder 71*d* to form a voice data packet, which is passed to the selective transmission unit 70. At this time, the encoding rate is within the rate control information $RFCS_3$, and moreover is currently permitted. This processing is similar even when a voice data packet with an invalid flag has been rate-converted and the flag made valid.

The rate specifier of the encoded voice data input to the selective transmission unit 70 of the transcoder $TC_3$ is (1) the rate specifier $RFCI_1$ according to the rate control information $RFCS_1$, if the voice data packet is a packet from the transcoder $TC_1$, and similarly, (2) the rate specifier $RFCI_2$ according to the rate control information $RFCS_2$, if the voice data packet is a packet from the transcoder $TC_2$. Consequently the radio network controller $RNC_3$ cannot correctly interpret the rate specifiers $RFCI_1$ and $RFCI_2$. Therefore, based on the previously validated encoding rate, a rate specifier $RFCI_3$ conforming to the rate control information $RFCS_3$ is again appended, the destination address is added, and the packet is transmitted.

Figure 12:
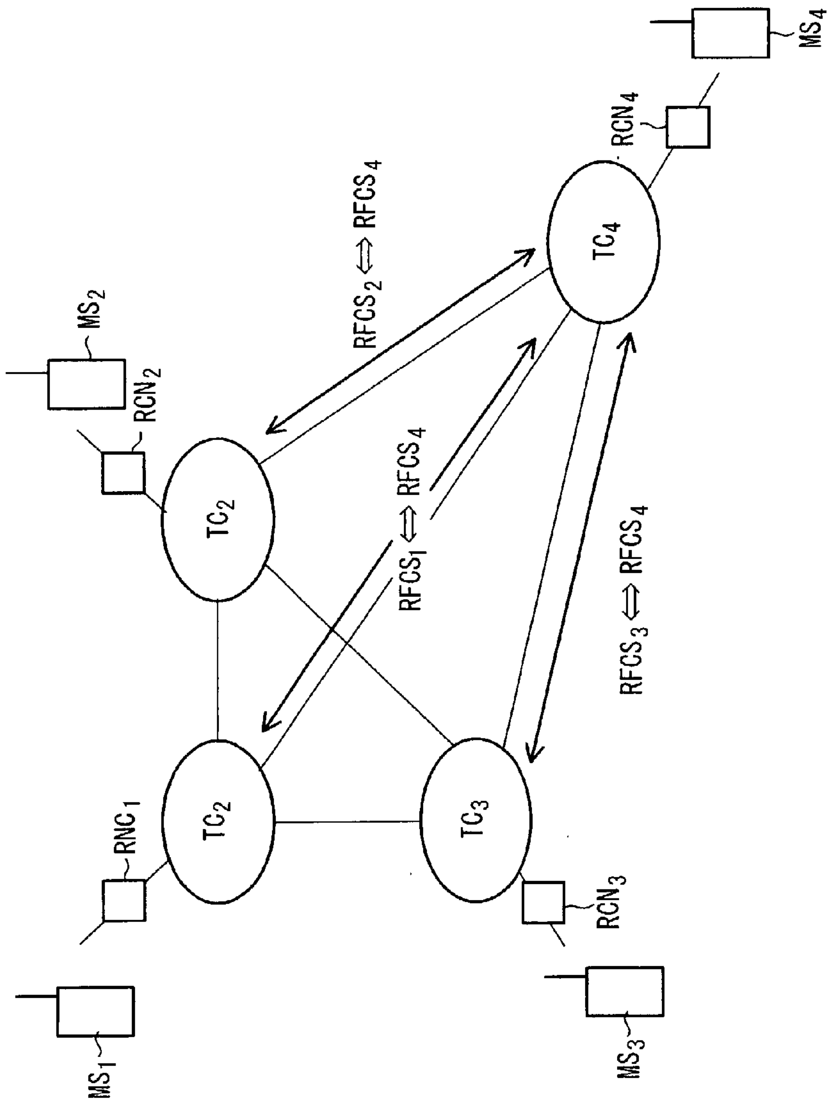
FIG. 12 is a figure explaining control of the transition from three-person voice communication to four-person voice communication.
Figure 13:
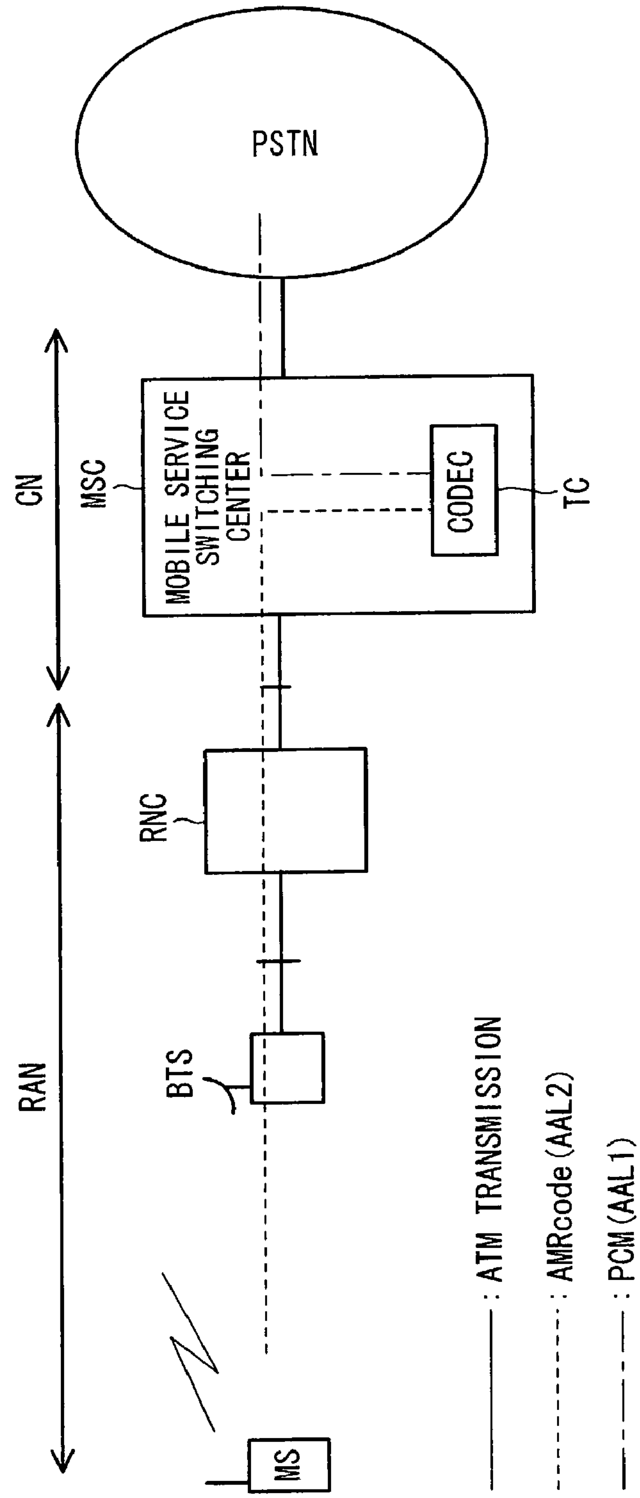
FIG. 13 is a diagram of the configuration of an IMT-2000 mobile core network.
Figures 14, 15, 16:
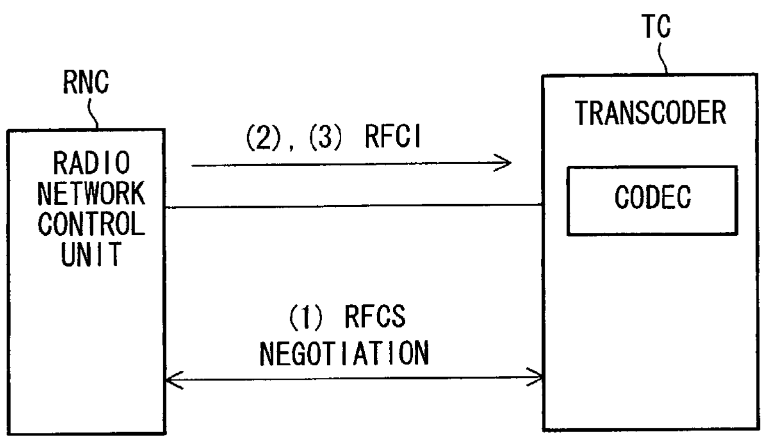
FIG. 14 is a figure explaining AMR rates.
FIG. 15 is a figure explaining codec rate control.
FIG. 16 is a figure explaining RFCS (rate control information)
Figure 17:
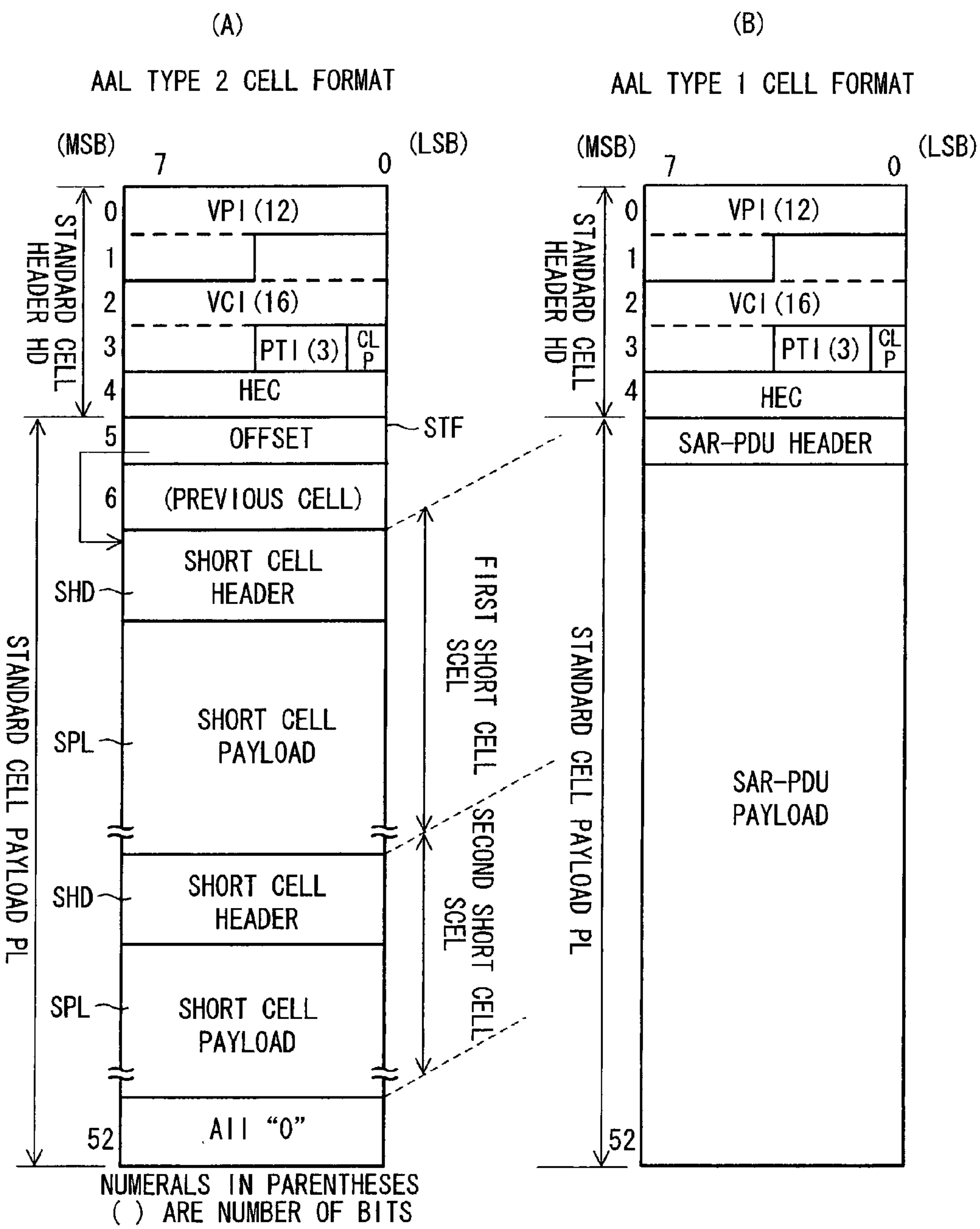
FIG. 17 shows the AAL type 1 and AAL type 2 cell formats.
Figure 18:
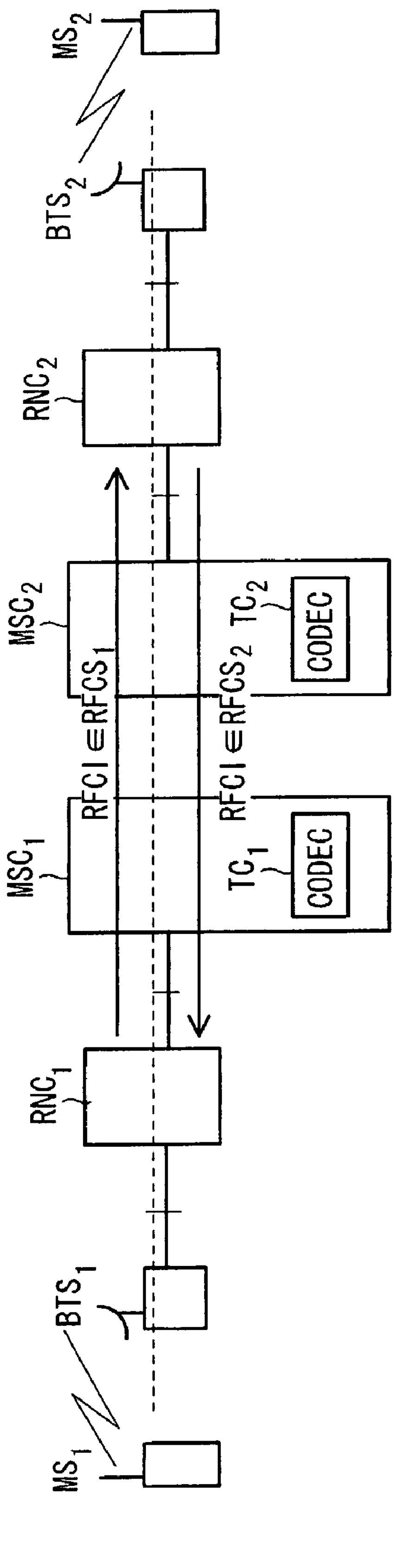
FIG. 18 is a figure explaining two-point communication using the TrFO method.
Figure 20:
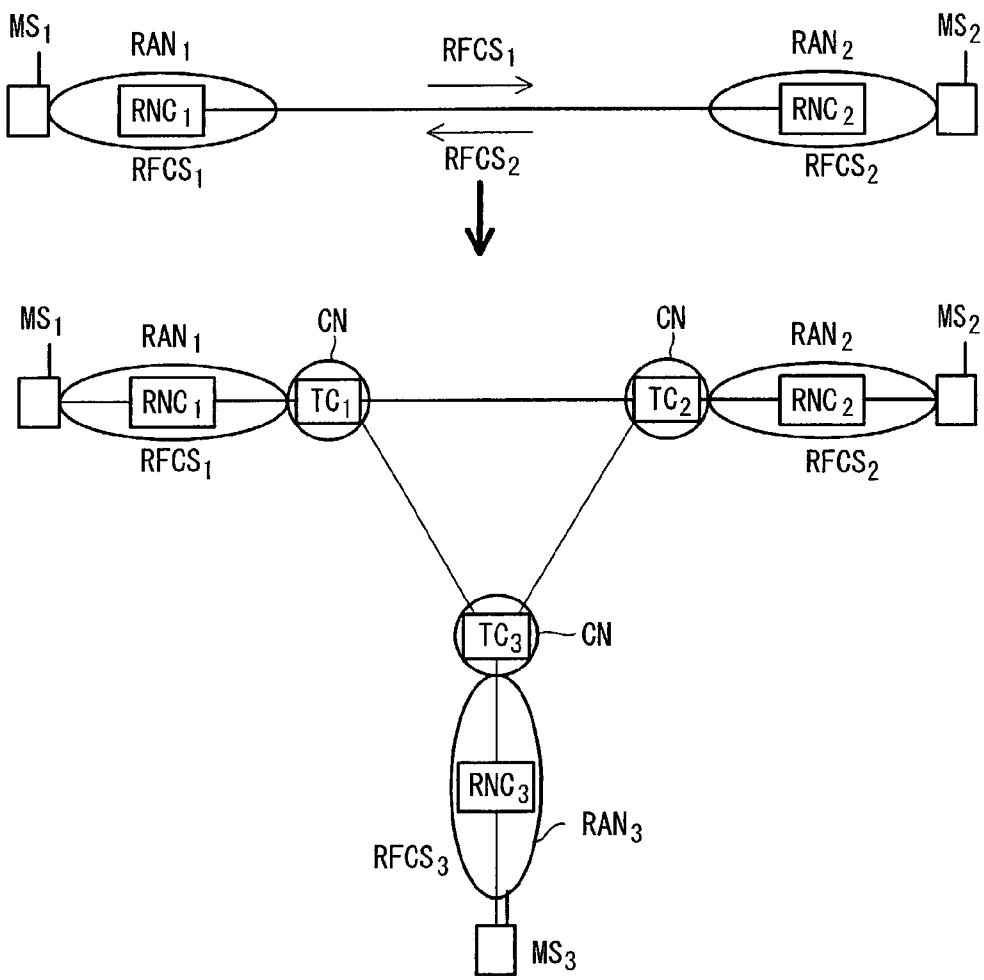

(G) Control for Transition from Three-Person Voice Communication to Four-Person Voice Communication FIG. 12 explains control in a transition from three-person voice communication to four-person voice communication.

As three-person voice communication is already established, there is no TrFO connection mode, and a transition is made from a state in which assigned transcoders $TC_1$ to $TC_3$ are connected to each of the radio network controllers $RNC_1$ to $RNC_3$, to a connection mode for four-person voice communication.

First, an assigned $TC_4$ to connect to the radio network controller $RNC_4$ of the newly participating mobile station $MS_4$ of the fourth person is started. That is, (1) the transmission origin address $RNC_{4out}$ of encoded voice data from the radio network controller $RNC_4$, received by the distributed communication unit 65 of the transcoder $TC_4$, (2) the transmission origin addresses of copies (the three transcoders $TC_{1in}$, $TC_{2in}$, $TC_{3in}$), (3) the transmission origin addresses ($TC_{1out}$, $TC_{2out}$, $TC_{3out}$) of encoded voice data from the transcoders $TC_1$, $TC_2$, $TC_3$ received by the selective reception unit 69, and (4) the transmission origin address $RNC_{4in}$ for transmission to the radio network controller $RNC_4$ by the selective transmission unit 70, are provided, and four-person communication (communication parameter N=4) is started. At this time, negotiation between TCs is also specified. The difference with control in a transition from two-person voice communication to three-person voice communication is the fact that as parameters, the addresses of three points, rather than the addresses of two points, are set.

In the transcoders $TC_1$ to $TC_3$ engaged up to this point in conversation in three-point communication, instructions for the addition of path settings and TC negotiation are issued. For example, in the transcoder $TC_1$, (1) the transmission destination address $TC_{4in}$ is newly added to the distributed transmission unit 65 in addition to the existing transmission destination addresses $TC_{2in}$, $TC_{3in}$, (2) the transmission origin address $TC_{4out}$ is newly added to the selective reception unit 69 in addition to the existing transmission origin addresses $TC_{2out}$, $TC_{3out}$ and (3) the parameter N=3 is changed to N=4, and TC negotiation is specified. Even without these instructions, negotiation of the transcoder's own rate control information $RFCS_1$ with the transcoder $TC_4$ may be performed in response to negotiation of the rate control information $RFCS_4$ from the transcoder $TC_4$.

When, as described above, negotiation between the newly participating transcoder $TC_4$ and the transcoders $TC_1$ to $TC_3$ is completed, the subsequent operation of the distributed transmission units 65, selective reception units 69, and selective transmission units 70 in each of these transcoders $TC_1$ to $TC_4$ is similar to the operation in the transition from two-person voice communication to three-person voice communication. That is, except for changing from distribution to two persons to distribution to three persons, and from selection from two persons to selection from three persons, operation is the same. The above is the same for more general cases of voice communication among N persons.

The above is a detailed explanation, but the following means can be prepared:

(1) Means to use, as the packet type for negotiation, a packet type in which encoded voice data and rate control information are included in the same packet;

(2) means to control the transcoders $TC_1$, $TC_2$ at each of the points in existing two-point communication, so that negotiation of each transcoder's rate control information is executed in response to negotiation of rate control information from the transcoder $TC_3$ of the newly participating terminal;

(3) caller notification means, to notify the terminals already engaged in voice communication of a call from the newly participating terminal, together with a telephone number;

(4) means to switch the current voice communication temporarily from the current other-party terminal to the newly participating terminal, in response to a call from the newly participating terminal; and, (5) billing means, to modify the system for billing to ensure equitable responsibility for fees, based on agreement among the speakers, in the event of multipoint voice communication.

By means of the above invention, when making a transition from two-point communication to three-point communication, it is possible to make preparations for three-point communication while maintaining two-point communication, that is, without interrupting the two-point communication; and after preparations are completed, a transition to three-point communication can be made, so that there is no momentary interruption of conversation.

Also, by means of this invention, when encoded voice data is received from only one other point, there is no need for decoding/encoding by a codec, so that voice quality can be maintained, and moreover when receiving encoded voice data simultaneously from two or more other points, decoding/synthesis/encoding is performed for each, so that the voices of a plurality of speakers can be heard simultaneously.

Further, by means of this invention, even when encoded voice data is received only from one other point, if the rate indicated by the rate specifier sent together with the encoded voice data is not permitted by the receiving device, the data is decoded based on this rate, the decoded voice data is encoded at a permitted encoding rate, and a rate specifier indicating the encoding rate is appended to the encoded voice data for transmission to the mobile station, so that the mobile station can reliably decode and output the received encoded voice data.

Also, by means of this invention, encoded voice data and rate control information are transmitted by an in-channel method, so that rate control information can be exchanged between codecs while maintaining two-point communication.

Further, by means of this invention, the separate control device which was required for multipoint communication in the prior art becomes unnecessary. Also, whereas in conventional methods multipoint control devices are linked by PCM data, posing the problem that a fixed broad band is required, in this invention VOX transmission of compressed encoded data is employed, so that circuits can be used efficiently. And, multipoint communication can be supported without modification to mobile terminals, so that existing terminals can be used without change.

What is claimed is:

1. A multipoint communication method, in which voice communication takes place among mobile stations via communication control devices, having a transcoder provided with a codec which performs encoding and decoding of voice signals, and a rate control unit which determines the encoding rate in the codec and employs the unit's own rate specifier to specify the encoding rate for the transcoder; comprising:

in two-point communication, connecting a rate control unit of the communication control device of one of the points to a rate control unit of the communication control device of the other point, without passing through a transcoder, exchanging between the two rate control units rate control information which is the correspondence relations between rate specifiers and encoding rates, and replacing at a rate control unit a rate specifier which is sent by the rate control unit at the other point together with voice data by its own rate specifier, referring to said rate control information, and transmitting the voice data with said rate specifier to the mobile station;

when making a transition from two-point communication to three-point communication, inserting transcoders in the communication path between the two points. While maintaining the communication, starting a transcoder for the third point to establish paths between the transcoders of different points, and controlling the transcoders at each point to acquire the rate control information for all points, thereafter a transition to three-point communication is performed; and, in the transcoders at each point, transmitting encoded voice data for transmission which is made to the transcoders at the plurality of other points, and in addition, processing encoded voice data received from other points for the purpose of multipoint communication, referring to the rate control information, and transmitting the processed encoded voice data to the mobile station.

2. A multipoint communication method, in which voice communication takes place among mobile stations via communication control devices, having a transcoder provided with a codec which performs encoding and decoding of voice signals, and a rate control unit which determines the encoding rate in the codec and employs the unit's own rate specifier to specify the encoding rate for the transcoder; comprising:

in two-point communication in which voice communication takes place between two mobile stations, connecting a rate control unit of the communication control device of one of the points to a rate control unit of the communication control device of the other point, without passing through a transcoder, exchanging between the two rate control units rate control information, which is the correspondence relations between rate specifiers and encoding rates, and replacing under a rate control unit a rate specifier which is sent by the rate control unit at the other point together with voice data by a rate specifier determined by referring to said rate control information, and transmitting the voice data with said rate specifier to the mobile station;

when making a transition from two-point communication to three-point communication, connecting rate control units in the communication control devices at each of the three points to transcoders and establishing communication paths between the transcoders, and continuing the two-point communication by transmitting the encoded voice data and rate specifier output from the rate control unit at one point in said two-point communication through transcoders, to the rate control unit of the other point of said two-point communication, and moreover transmitting the encoded voice data and rate specifier sent from the rate control unit of the other point to the rate control unit of said one point of said two-point communication, through transcoders;

in parallel with said transition control, making the transcoders at all points to acquire the rate control information for all points to shift to three-point communication;

in the transcoders at each point, transmitting encoded voice data for transmission which is made in duplicate to the transcoders of a plurality of other points; and then in the transcoders at each point, (1) replacing a rate specifier sent from other points together with encoded voice data by a rate specifier which is determined by referring to said rate control information and transmitting the voice data with this specifier to the mobile station, or, (2) decoding each encoded voice data from other points, encoding the decoded voice data at a permitted encoding rate, appending a rate specifier indicating the encoding rate to the encoded voice data, and transmitting the encoded voice data to the mobile station.

3. The multipoint communication method according to claim 2, further comprising:

when making a transition from m-point communication ($m \geqq 3$) to (m+1)-point communication, connecting a rate control unit in the communication control device of the (m+1)th point to a transcoder while maintaining m-point communication, establishing communication paths between the transcoders at different points, and controlling the transcoders at each point to acquire the rate control information for all points, thereafter a transition to (m+1)-point communication is performed.

4. The multipoint communication method according to claim 2, comprising:

when the transcoders at each point in multipoint communication receive encoded voice data from only one other point, replacing a rate specifier which is sent together with the encoded voice data by a rate specifier which is determined by referring to said rate control information, and transmitting the encoded voice data with this rate specifier to the mobile station; and, when the transcoders at each point in multipoint communication receive encoded voice data simultaneously from two or more other points, encoding the encoded voice data from each point based on the encoding rate indicated by a specifier sent together with the voice data, combining the decoded voice signals and encoding the combined voice signals at a permitted encoding rate, and transmitting the encoded voice data together with a rate specifier indicating the encoding rate to the mobile station.

5. The multipoint communication method according to claim 4, further comprising:

even when the transcoders at each point receive encoded voice data from only one other point, if the encoding rate indicated by the rate specifier sent together with the encoded voice data is not permitted to that transcoder, decoding the received encoded voice data based on that rate specifier encoding the decoded voice data at a permitted encoding rate and appending a rate specifier indicating the encoding rate to the encoded voice data, and transmitting the encoded voice data to the mobile station.

6. The multipoint communication method according to claim 2, further comprising:

when making a transition from two-point communication to three-point communication, transmitting rate control information to the transcoders at both points from the rate control units at each of the points in said two-point communication, transmitting rate control information to the transcoder at the third point from the rate control unit at the third point, and then exchanging the rate control information between the transcoders at the three points, so that the transcoders at each point are made to acquire the rate control information for all points.

7. The multipoint communication method according to claim 6, further comprising:

transcoders are activated by the initiation of negotiation of rate control information with the rate control unit, and perform negotiation of rate control information with other transcoders.

8. The multipoint communication method according to claim 2, further comprising:

said rate control unit uses the same channel used for encoded voice data to perform negotiation of rate control information with other transcoders.

9. A communication control device, comprising:

a transcoder provided with a codec which encodes and decodes voice signals;

a rate control unit which controls the encoding rate of the codec and employs a rate specifier to specify the encoding rate for the transcoder; and a switching unit which switches routes; wherein said rate control unit comprises means to negotiate rate control information, which is the correspondence relations between rate specifiers and encoding rates, with the transcoder in the event of multipoint communication;

said transcoder comprises (1) means to perform negotiation of rate control information with the transcoders of other points in the event of three-point communication; (2) means to accumulate rate control information for all points; (3) means to create and broadcast copies of encoded voice data to all other points; (4) means to receive encoded voice data from other points; (5) a codec which decodes encoded voice data received from other points, at an encoding rate indicated by a rate specifier sent together with the encoded voice data, and which encodes decoded voice data at a permitted encoding rate; and, (6) a transmission unit which appends a rate specifier corresponding to said encoding rate to encoded voice data output from the codec and transmits the encoded voice data with the rate specifier, or, which replaces the rate specifier of said received encoded voice data by a rate specifier which is determined by referring to said rate control information and transmitting the received encoded data with the new rate specifier, and, while maintaining two-point communication, the switching unit establishes a communication path between the rate control unit and the transcoder, and communication paths between the transcoder and the transcoders of other points; the transcoder acquires rate control information for all points via said communication paths; and, in three-point communication, (1) during transmission, the transcoder replicates encoded voice data and transmits copies to the transcoders at other points, and (2) during reception, the transcoder replaces the rate specifier sent together with encoded voice data by a rate specifier which is determined by referring to said rate control information, and transmits the encoded voice data with said rate specifier to the mobile station, or, decodes each of the received encoded voice data, encodes the decoded voice data at a permitted encoding rate, appends a rate specifier indicating the encoding rate to the encoded voice data, and transmits the encoded voice data with said rate specifier to the mobile station.

10. The communication control device according to claim 9, wherein, in two-point communications, the switching unit connects the rate control unit to the rate control units of the communication control device of the other point, without passing through a transcoder, and each of the rate control units exchanges rate control information with the rate control unit of the other point, and replaces the rate specifier sent together with voice data from the rate control unit of the other point with a rate specifier which is determined by referring to said rate control information.

11. The communication control device according to claim 10, wherein, when making a transition from two-point communication to three-point communication, the switching unit connects the rate control unit to the transcoder and establishes communication paths between the transcoder and the transcoders of the other points; the transcoder transmits encoded voice data output from the rate control unit to the rate control unit of the other point of the two-point communication, and inputs the encoded voice data sent from the rate control unit of said other point to the rate control unit; and the rate control unit maintains two-point communication by continuing control in said two-point communication.

12. The communication control device according to claim 9, wherein, in multipoint communication, when encoded voice data is received from only one other point, the transcoder replaces the rate specifier sent together with said encoded voice data with a rate specifier which is determined by referring to said rate control information, and transmits the encoded voice data with new rate specifier to the mobile station; and, when encoded voice data is received simultaneously from two or more other points, the transcoder decodes each of the encoded voice data based on the rate indicated by the rate specifiers sent together with the encoded voice data, synthesizes the decoded voice signals, encodes the synthesized voice signals at a permitted encoding rate, appends a rate specifier indicating the encoding rate to the encoded voice data, and transmits the data to the mobile station.

13. The communication control device according to claim 12, wherein, in multipoint communication, even when encoded voice data is received from only one other point, if the rate indicated by the rate specifier sent together with the encoded voice data is not permitted to the transcoder, the transcoder decodes the received encoded voice data based on said rate, encodes the decoded voice data at a permitted encoding rate, and sends the encoded voice data, together with a rate specifier indicating the encoding rate, to the mobile station.

14. The communication control device according to claim 9, wherein said rate control unit uses the same channel as that used for encoded voice data to negotiate the rate control information with other transcoders.

* * * * *